(12) United States Patent
Park

(10) Patent No.: US 7,643,449 B2
(45) Date of Patent: Jan. 5, 2010

(54) COMBINED BASE TRANSCEIVER STATION AND BASE STATION CONTROLLER DATA CALL AND QUALITY OF SERVICE

(75) Inventor: Hyeon Bong Park, Plano, TX (US)

(73) Assignee: Airwalk Communications, Inc., Richardson, TX (US)

(*) Notice: Subject to any disclaimer, the term of this patent is extended or adjusted under 35 U.S.C. 154(b) by 217 days.

(21) Appl. No.: 11/037,387

(22) Filed: Jan. 18, 2005

(65) Prior Publication Data

US 2006/0159018 A1    Jul. 20, 2006

(51) Int. Cl.
*H04W 4/00* (2009.01)
(52) U.S. Cl. ........................................... 370/329
(58) Field of Classification Search ............... 370/235, 370/252, 329, 331, 335, 341, 468
See application file for complete search history.

(56) References Cited

U.S. PATENT DOCUMENTS

| | | | |
|---|---|---|---|
| 6,070,073 A | 5/2000 | Maveddat et al. | |
| 6,088,578 A * | 7/2000 | Manning et al. | 455/68 |
| 6,493,328 B2 * | 12/2002 | Fong et al. | 370/329 |
| 6,590,874 B1 | 7/2003 | Wang et al. | |
| 6,625,137 B1 * | 9/2003 | Kang | 370/338 |
| 6,862,268 B2 * | 3/2005 | Tripathi et al. | 370/252 |
| 6,885,668 B1 * | 4/2005 | Lee et al. | 370/395.1 |
| 7,020,112 B2 * | 3/2006 | Cleveland et al. | 370/335 |
| 7,031,747 B2 | 4/2006 | Cyr et al. | |
| 7,047,001 B2 * | 5/2006 | Chen | 455/422.1 |
| 7,127,248 B1 | 10/2006 | Costa et al. | |
| 7,133,672 B2 * | 11/2006 | Sayeedi | 455/432.1 |
| 7,299,052 B2 | 11/2007 | Ji et al. | |
| 2003/0119518 A1 | 6/2003 | Cleveland et al. | |
| 2003/0133415 A1 * | 7/2003 | Kim et al. | 370/235 |
| 2003/0223393 A1 | 12/2003 | Lee | |
| 2004/0042410 A1 * | 3/2004 | Harris et al. | 370/252 |
| 2004/0071163 A1 * | 4/2004 | Hogberg et al. | 370/468 |
| 2004/0095901 A1 * | 5/2004 | Rajkotia | 370/328 |
| 2004/0110512 A1 | 6/2004 | Lim | |
| 2004/0185868 A1 | 9/2004 | Jain et al. | |
| 2004/0203957 A1 | 10/2004 | George | |
| 2005/0101329 A1 | 5/2005 | Gallagher | |
| 2005/0186948 A1 | 8/2005 | Gallagher et al. | |
| 2007/0014281 A1 | 1/2007 | Kant | |
| 2007/0129077 A1 * | 6/2007 | Iguchi et al. | 455/442 |
| 2007/0238448 A1 | 10/2007 | Gallagher et al. | |
| 2007/0243872 A1 | 10/2007 | Gallagher et al. | |
| 2007/0254648 A1 | 11/2007 | Zhang et al. | |

OTHER PUBLICATIONS

E1962B/E6702B cdma2000 Online User's Guide. Last updated Oct. 29, 2004. Retrieved from "http://web.archive.org/web/20051108141922/http://wireless.agilent.com/rfcomms/refdocs/cdma2k/c2kla_dc_serv_opt.php" Jul. 19, 2007.*

* cited by examiner

*Primary Examiner*—Lester Kincaid
*Assistant Examiner*—Nathan Mitchell

(57) ABSTRACT

A system, method, and computer readable medium for determining a data call rate comprises determining if a supplemental channel (SCH) should be allocated, if the SCH should be allocated, potentially altering the data rate, requesting an SCH allocation at a current data rate or the altered data rate, and receiving a response to the request with the current data rate, the altered data rate, or a further altered data rate.

20 Claims, 11 Drawing Sheets

| 502 | 504 | 506 | 508 | 510 |
|---|---|---|---|---|
| 16x | 8x | 4x | 2x | 1x |
| 1 |  |  |  | 1 |
| 2 |  |  |  | 2 |
| 2 | 1 |  |  | 3 |
| 2 | 2 |  |  | 4 |
| 1 | 4 |  |  | 5 |
|  | 6 |  |  | 6 |
|  | 6 | 1 |  | 7 |
|  | 5 | 3 |  | 8 |
|  | 4 | 5 |  | 9 |
|  | 2 | 8 |  | 10 |
|  | 1 | 10 |  | 11 |
|  |  | 12 |  | 12 |
|  |  | 11 | 2 | 13 |
|  |  | 9 | 5 | 14 |
|  |  | 8 | 7 | 15 |
|  |  | 6 | 10 | 16 |
|  |  | 5 | 12 | 17 |
|  |  | 3 | 15 | 18 |
|  |  | 2 | 17 | 19 |
|  |  |  | 20 | 20 |

| Attempt Call | 16x | 8x | 4x | 2x |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |

COMBINED BASE TRANSCEIVER STATION AND BASE STATION CONTROLLER DATA CALL AND QUALITY OF SERVICE

CROSS REFERENCE TO RELATED APPLICATIONS

The present patent application is related to patent application Ser. No. 11/037,063 entitled Combined Base Transceiver Station and Base Station Controller, patent application Ser. No. 11/037,813 entitled Combined Base Transceiver Station and Base Station Controller Call Origination and Termination, patent application Ser. No. 11/037,814 entitled Combined Base Transceiver Station and Base Station Controller Handoff, patent application Ser. No. 11/037,386 entitled Combined Base Transceiver Station and Base Station Controller Data Call, and patent application Ser. No. 11/037,388 entitled Combined Base Transceiver Station and Base Station Controller Optimized Assignment Of Frame Offsets, each of which is assigned to the assignee of the present invention and is filed on even date herewith.

BACKGROUND OF THE INVENTION

The present invention is related to a base transceiver station and a base station controller, and, more specifically to a combined base transceiver station and a base station controller.

Current cellular operators predominantly provide services via very large or macro coverage areas. Limitations encountered by these operators include the difficulty of providing reliable in-building or campus coverage. Such coverage should provide subscribers with seamless services at a particular quality level, and should provide operators with additional revenue sources.

Therefore, what is needed is a wireless solution that overcomes the aforementioned limitations by providing a micro solution that compliments the wireless macro network by providing increased voice and data capacity and coverage.

SUMMARY OF THE INVENTION

The present invention provides a radio access network (RAN) system (which contains a base transceiver station and a base station controller integrated into a single compact platform) for wireless coverage and in-building services, as well as for providing additional capacity in a macro network when it comes to filling "hotspots." Such a RAN system, which preferably operates in or in conjunction with a CDMA network, supports signaling, traffic, handoff, power, and control, while providing multiple interfaces to the core network.

In one embodiment, a method for determining a data call rate comprises determining if a supplemental channel (SCH) should be allocated, if the SCH should be allocated, potentially altering the data rate, requesting an SCH allocation at a current data rate or the altered data rate, and receiving a response to the request with the current data rate, the altered data rate, or a further altered data rate.

In another embodiment, a system for determining a data call rate comprises a base station controller (BSC) adapted to determine if a supplemental channel (SCH) should be allocated, a base transceiver station (BTS) adapted to receive an SCH allocation at a current data rate or an altered data rate from the BSC, and the BSC adapted to receive the current data rate, the altered data rate, or a further altered data rate from the BTS.

In a further embodiment, a computer readable medium comprises instructions for: determining if a supplemental channel (SCH) should be allocated, requesting an SCH allocation at a current data rate or an altered data rate, and receiving a response to the request with the current data rate, the altered data rate, or a further altered data rate.

BRIEF DESCRIPTION OF THE DRAWINGS

FIG. 8 depicts a table indicating a supplemental channel (SCH) rate for a data call in accordance with a preferred embodiment of the present invention;

FIG. 9 depicts a plurality of tables that describe each attempted FCH calls in accordance with a preferred embodiment of the present invention; and FIG. 10 depicts a maximum SCH rate for plurality of data call attempts in accordance with a preferred embodiment of the present invention.

DETAILED DESCRIPTION OF THE INVENTION

Figure 1:
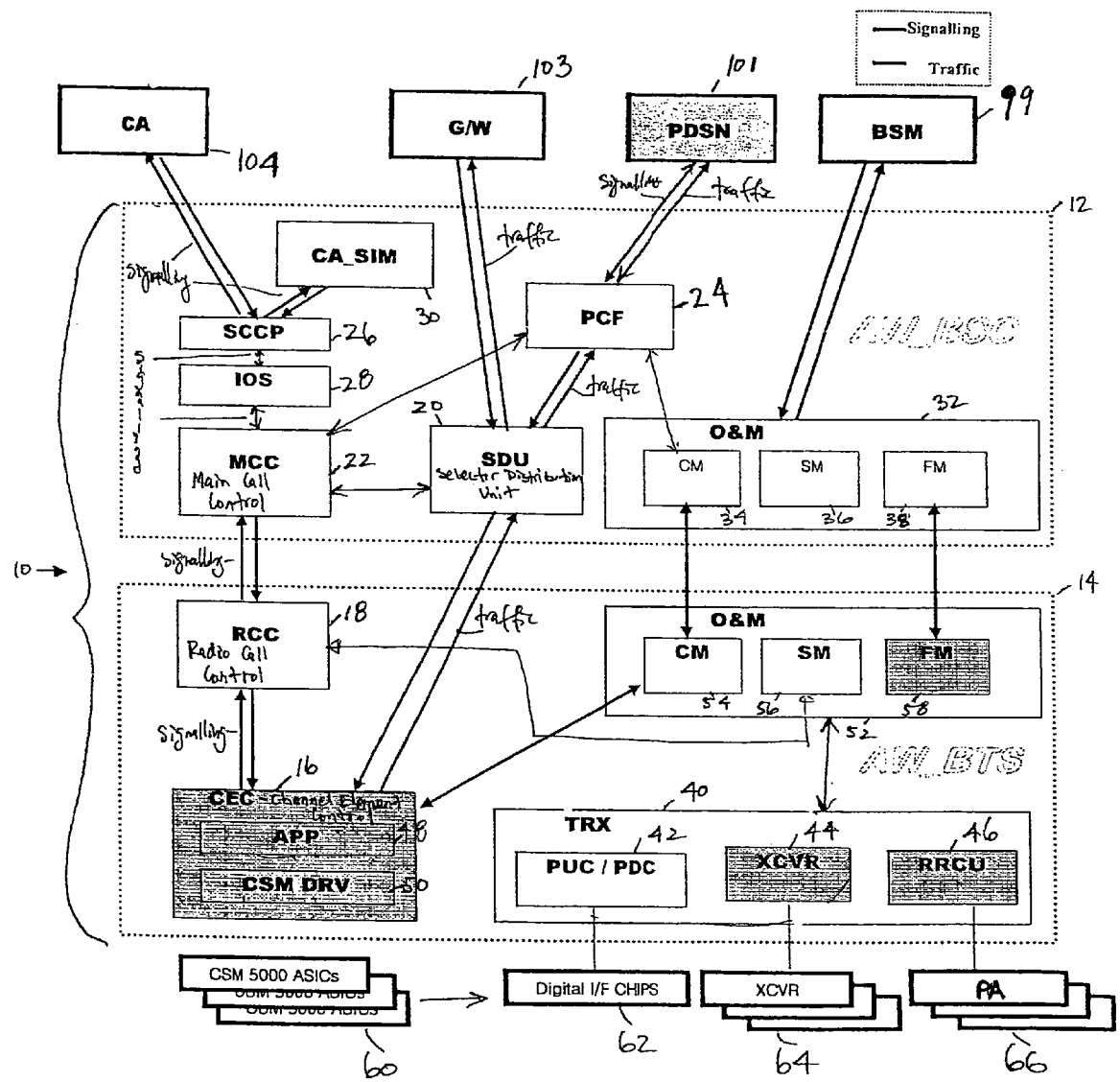
FIG. 1 depicts a radio access network (RAN) in accordance with a preferred embodiment of the present invention.

Referring now to FIG. 1, radio access network (RAN) 10 comprises a base station controller (BSC) 12 and a base transceiver station (BTS) 14 that comprise a number of blocks or modules. These blocks or modules are software, hardware, firmware, and/or a combination of software, hardware, and/or firmware. The BSC 12 comprises a selector distribution unit (SDU) 20 coupled to a main call control (MCC) 22 and to a packet control function (PCF) 24 which is also coupled to the MCC 22, a signaling control connection part (SCCP) 26 coupled to an interoperability system (IOS) 28 which is also coupled to the MCC 22, a call agent simulator (CA_SIM) 30 which is coupled to the SCCP 26, and an operation, administration, and maintenance (OA&M) 32 module coupled to the PCF 24.

Main Call Control (MCC) 22

The MCC 22, which performs the operations that pertain to individual subscribers including registration, call setup, call release, handoff and other subscriber features, is associated with the following functionality:

Registration

Mobile registration is a process where mobile characteristics such as location or status are provided to the network. Registration may be initiated by a mobile station (MS, not shown), by a network, or implied during access by the MS. To support these features, the MCC 22 interfaces with a radio call control module (RCC) 18, which will be described further below, and with a call agent (CA) 104. The CA 104 is preferably a soft switch whose functions include call processing, supplementary service, registration, interacts with a Home Location Register (HLR) in the macro network, and provides common PBX functions.

Mobile Originated Call Setup for Voice and Circuit Data Calls

The MCC 22 receives an Origination Message from the MS via the RCC 18 and then communicates with CA 104 to request call service, confirm the validity of the MS, as well as get the resource information from a media gateway (MG, not shown). The MG mediates the elements between circuit switched voice networks and an IP network. For example, the MG relays voice, fax, modem and data traffic over the EP network. The MCC 22 interfaces with the RCC 18 to request a radio resource and with the SDU 20 to allocate a selector resource.

Mobile Terminated Call Setup for Voice and Calls and Circuit Data Calls

The MCC 22 receives a Paging Request message from the CA 104 and passes it to the RCC 18 to initiate a mobile terminated call setup scenario. The MCC 22 receives a Page Response Message then communicates with the CA 104 to get the resource information from the MG and indicate for the call to be answered at the MS. The MCC 22 interfaces with the RCC 18 to request a radio resource and with the SDU 20 to allocate a selector resource.

Call Clearing of Voice and Circuit Data Calls

Call clearing may be initiated by either the MS, the SDU 20 or the CA 104. The MCC 22 sends clear messages to the SDU 20 or to the CA 104 and releases internal resources.

Mobile Originated Call Setup for Packet Data Calls

The MCC 22 receives an Origination Message from the MS via the RCC 18 with a data rate to send set to 'true' (DRS=1) and a packet data service option, and then communicates with the CA 104 to request packet data service and confirm the validity of the MS. The MCC 22 interfaces with the PCF 24 to setup a connection to a packet data serving node (PDSN) 101, which exchanges packets with the MS over the radio and the other IP networks, with the RCC 18 to requests a radio resource, and with the SDU 20 to allocate a selector resource.

Reactivation of Packet Data Calls

The MCC 22 supports either the MS initiated or network initiated reactivation from a dormant state. With a MS initiated reactivation, a normal packet data call setup procedure in the MCC ensues, while with a network initiated reactivation, the MCC 22 sends a base station (BS, not shown) Service Request to the CA 104 to begin an initiated call setup as a request from the PCF 24. The BS, which is a fixed station that communicates with the MS, may be a cell, a sector within a cell, a mobile switching center (MSC), or other part of the wireless system.

Call Clearing of Packet Data Calls

Call clearing may be initiated by either the MS, the SDU 20, the CA 104 or the PCF 24. During a call clearing scenario, the MCC 22 sends clear messages to the SDU 20, the CA 104 and the PCF 24 and releases internal resources.

Transition to Dormancy for Packet Data Calls

If the MS transits to a Dormant State, the MCC 22 proceeds in a normal packet call release scenario and notifies the CA while setting the release cause to "packet call going dormant." The MCC 22 also supports Dormant Handoff.

Short Data Bursts

The MCC 22 supports a Short Data Burst which consists of a small number of frames that are transmitted to a MS with a dormant packet data service instance.

Inter-BS Handoff

The MCC 22 supports soft handoff, inter-frequency assignment (FA) hard handoff and intra-FA hard handoff. The MCC 22 interfaces with the RCC 18 to get radio resources as request from the SDU 20 and manages neighbor lists.

Inter-CA Hard Handoff

When the MCC 22 receives a handoff request message from the SDU 20 and the handoff type is inter-CA hard handoff, the MCC 22 sends a Handoff Required message to the CA 104 to initiate an inter-CA hard handoff as a serving part. If the MCC 22 receives a Handoff Request message from the CA 104, the MCC 22 initiates an inter-CA hard handoff scenario as a target part.

Terminal Authentication

Terminal authentication is the process by which information is exchanged between the MS and the network to confirm the identity of the MS. The MCC 22 delivers relegated messages to the SDU 20, the RCC 18 and the CA 104.

Short Message Service

Short Message Service (SMS) is a mechanism of delivery of short messages over the mobile network. The MCC 22 supports messages and process for SMS mobile originated calls, SMS mobile terminated calls, and SMS Broadcast calls.

Supplementary Services

The MCC 22 supports various supplementary services including Message Waiting, Call Forwarding, Call Delivery, Call Transfer, Three Way Calling, and Conference Calling in terms of communicating with the RCC 18 using a Feature Notification Message or with the SDU 20 using Flash with an Information Message.

Test Calls

The MCC 22 initiates the test call process as a request from the base station manager (BSM 99) or on receiving an Origination Message with a look back service option from the MS.

Call Trace

The MCC 22 initiates the call trace process as a request from the WPM. The MCC 22 stores the related information to a buffer and starts a trace whenever the MS requests call service.

Selector Distribution Unit (SDU) 20

The SDU 20, which includes an air interface portion that processes air messages between the SDU and a MS, a router interface portion that processes messages between the SDU and other software blocks, and a portion that processes voice and data calls, is associated with the following functionality:

Multiplex and De-Multiplex

This function multiplexes and de-multiplexes user traffic and signaling traffic for the air interface.

Forward and Reverse Traffic Frame Selection and Distribution

This function is responsible for selecting the best quality incoming air interface reverse link frame involved in the soft handoff, and distributes forward air interface frames to all channel elements involved in a call.

Handoff Type Decision and Handoff Direction

This function decides a handoff type that will be processed including soft handoff, softer handoff, hard handoff, etc., and directs handoff processing to other software blocks such as the MCC 22 and a traffic channel element (TCE) in the CEC 16.

Process Radio Link Protocol (RLP) Procedures

A RLP Type 1, 2, and 3 is used with IS-95A/B or cdma2000 traffic channels to support CDMA data services. The RLP, which is a connection-oriented, negative-acknowledgement based data delivery protocol, provides an octet stream transport service over forward and reverse traffic channels. The RLP includes procedures to reduce the error rate exhibited by CDMA traffic channels.

Forward and Reverse Power Control

This function generates or utilizes relevant power control information that is exchanged over the air interface or the channel element.

Process Test Call Procedures

This function supports an MS loop-back call, such as a service option 2 and a service option 9 call.

Process Real Time Protocol (RTP) Procedures

This function is responsible for interfacing with a MG or other BSCs.

Process Signaling Layer 2 Procedures

This function performs the layer 2 functionality of the air interface signaling protocol and is responsible for the reliable delivery of the layer 3 signaling messages between the BSC and the MS.

Process Generic Routing Encapsulation (GRE) Procedures

This function is responsible for interfacing with the PDSN 101.

Media Gateway (G/W) 103

The SDU 20 receives data, formats it and then sends it to the GAW 103. Similarly, data received from the G/W 103 can be formatted by the SDU 20.

Signaling Control Connection Part (SCCP) 26

The SCCP 26 is used to provide a referencing mechanism to identify a particular transaction relating to, for instance, a particular call. The current implementation of the A1 interface using TCP/IP protocol employs an SCCP implementation which provides the minimal functionality required to create the CALL context in which to pass IOS messages and monitor the TCP/IP connection. The SCCP 26 is associated with the following functionality:

TCP/IP Connection Establishment—The SCCP creates a TCP/IP socket as a client to communicate with the CA 104.

Signaling Connection Establishment—A new transaction, such as location updating, or an incoming or outgoing call, is initiated on the radio path. Following an Access Request made by the MS on the access channel, the connection establishment is then initiated by the BS. If the CA 104 decides to perform an inter-CA hard handoff, the connection establishment is initiated by the CA 104.

Signaling Connection Release

This procedure is normally initiated at the CA 104 but in the case of abnormal SCCP connection release, the BS may initiate a connection clearing.

Interoperability System (IOS) 28

The IOS 28 processes messages from the CA 104 or the MCC 22 and converts between internal message format and standard format. A Base Station Application Part (BSAP) is the application layer signaling protocol that provides messaging to accomplish the functions of the A1 Interface component of the CA-BS Interface. The BSAP is split into two sub-application parts: the BS Management Application Part (BSMAP), and the Direct Transfer Application Part (DTAP). The BSMAP supports all Radio Resource Management and Facility Management procedures between the CA 104 and the BS, or to a cell(s) within the BS. BSMAP messages are not passed to the MS, but are used to perform functions at the CA 104 or the BS. A BSMAP message (Complete Layer 3 Information) is also used together with a DTAP message to establish a connection for a MS between the BS and the CA 104, in response to the first layer 3 air interface message sent by the MS to the BS for each MS system request. The DTAP messages are used to transfer call processing and mobility management messages between the CA 104 and BS. DTAP messages carry information that is primarily used by the MS. The BS maps the DTAP messages going to and coming from the CA from/into the appropriate air interface signaling protocol.

The IOS 28 is associated with the following functionality:

Encoding Messages

The IOS messages proprietary format from the MCC 22 as the A interface specifications for sending to the CA.

Decoding Messages

The IOS 28 converts messages from the CA 104 to internal messages.

Packet Control Function (PCF) 24

The PCF 24 is a packet control function to manage the relay of packets between the BS and the PDSN 101. In a cdma2000 wireless network, access to packet data services is provided by the PDSN 101. The PCF 24 provides call processing functionality within the Radio Access Network (RAN) interfaces with the PDSN 101 and interfaces with the MCC 22 and the SDU 20 to provide internal signaling and packet delivery. The interface between the PCF 24 and the MCC 22 is called the A9 interface and the interface between the PCF 24 and the SDU 20 is the A8 interface. The interface between the PDSN 101 and the PCF 24, which is the interface between the radio and packet network, is known as the R-P interface or the A10/A11 interface.

The PCF 24 is associated with the following functionality: Main Processing which creates tasks and receives messages over IP, Message Processing which generates and extracts message by packing and unpacking, A10/A11 Processing which processes the A10/A11 interface, A8/A9 Processing which processes the A8/A9 interface, Hash Processing which performs the MD5 hashing function, Timer Processing which handles timer set, timer cancel, and timeout processing, Utility for primitives and debugging commands, and Call Control for call processing of originating, terminated and handoff calls.

Call Agent Simulator (CA SIM) 30

For wireless voice and data communications, various components, such as the CA 104 in the core network and the IP-BS in the Radio-Access Network, are necessary components. The installation of other components in the core network, such as the CA 104, a HLR, etc., constitutes a large expense. To increase the efficiency and flexibility, a CA-simulator 30 can be provided so that voice and data calls are possible without connecting to the CA 104 or to an HLR. As such, an IP-BS can be installed in a small wireless network without a CA or HLR.

Operation, Administration and Maintenance (OAM) 32

The OAM block 32 is associated with the following functionality: a Configuration Management (CM) block 34 that configures each block or module of the BSC 12 based on program load data (PLD) information (which includes parameters, such as a system ID, an IP address, etc., to configure the system)which can be downloaded from a server, a Status Management (SM) block 36 that obtains a status of the BSC 12 and reports the status to the BSM 99, and a Fault Management (FM) block 38 that checks and detects system faults or alarms and reports them to the BSM.

Referring again to FIG. 1, the radio access network (RAN) 10 further comprises a base transceiver station (BTS) 14. The BTS 14 comprises a Channel Element Control (CEC) 16 coupled to the Radio Call Control (RCC) 18, an Operation, Administration and Maintenance (OAM) 52 block coupled to the CEC, to the RCC, and to a Transmit and Receive Interface (TRX) 40.

The Channel Element Control (CEC) 16

The CEC block 16 controls the call processing to interface with the MS. The CEC also interfaces with upper layer blocks to handle over the air messages to set-up, maintain, and terminate voice and data calls. In order to make these calls, both signaling and traffic frames must be transmitted and received to and from the MS. It is also important for these frames to be transmitted and received at the right time with correct information. This is accomplished by using, for example, a modem chip, such as the Qualcomm CSM5000 modem chip 60, I/F chips 62, a transceiver 64 and a power amplifier 66. The components 60-66 are predominantly hardware components that can be co-located within the RAN 10. The CEC block 16 is associated with the following functionality:

Overhead Channel Configurations

The CEC 16 receives overhead channel configuration messages from the RCM and sets the parameters to the driver of the modem chip 60.

Air Message Encapsulation and Transmission

The CEC 16 encapsulates and sends a frame for sync channel message transmission (at, for example, every 80 msec) and sends a frame for paging channel message transmission (at, for example, every 20 msec). To transmit each frame of the sync and paging channel, the CEC 16 revokes semaphores periodically by external interrupt request source.

CSM Built-In Test

The CEC 16 provides a built-in test function for the modem chip 60 which includes checking a register test, an interrupt test, as well as a reverse ARM test. This test can be performed by an operator's request to show if the modem chip 60 is functioning properly or not.

Forward and Reverse Power Control

The CEC 16 supports forward and reverse power control processing.

Process Time of Day (TOD) Message

The CEC 16 receives the TOD message via a GPS (at, for example, every 2 sec) and processes it to get the system time and GPS status.

Process Loopback Call Procedures

This function supports MS-BTS loop-back call, This function can show if air-interface between MS and BTS works well.

Process Traffic Channel Processing

The CEC 16 is responsible for assigning a traffic channel and clearing it by the order of RCC 18. When the traffic channel is setup, the CEC 16 delivers traffic packets between the SDU 20 and the MS.

Maintain Forward and Reverse Link

The CEC 16 checks the forward and reverse path and reports them to a status or statistics block.

Process High Speed Data Service

The CEC 16 is responsible for processing supplemental channel (SCH) packets for high speed data service which supports up to, for example, 128 kbps. The SCH packets are used if additional channels are needed to handle the transfer of the data.

Process Soft and Softer Handoff procedure

The CEC 16 is responsible for processing Soft and Softer Handoffs.

Provide H/W Characteristics Test Functionalities

The CEC 16 supports various hardware characteristics tests such as an access probe test, a AWGN test, etc. Theses tests determine if the RF or the IF properties of each of the basestations are in order to ensure (via, for example, a good path ) that messages can be transferred.

The CSM application 48 is adapted to receive data from the CSM (or modem chip 60) Driver 50.

Radio Call Control (RCC) 18

The call control of the air interface is provided by the RCC 18. The air interface between the MS and the BTS 14 is specified by, for example, the TIA/EIA-95-A/B and the cdma2000 standards, which include the core air interface, minimum performance, and service standards. The functionalities of the RCC 18 consist of call processing, resource management, and supplementary services. The RCC 18 provides call processing functionality in order to setup and release call and resource management of radio resources such as CDMA channels, traffic channel elements, Walsh code channels, frame offsets, etc. The RCC 18 also provides signaling functionality by interfacing with other relevant software blocks.

The RCC 18 provides various processing functions including: Main Processing which creates tasks and receives messages over IP, Resource Management which processes resource allocation and de-allocation, Message Processing which generates and extracts message by packing and unpacking, Initialization Processing which initializes buffers and variables, RCV. from RSCH processing which processes all messages on the reverse common signaling channel, RCV. from RDCH processing which processes some messages on the reverse dedicated signaling channel, RCV. from MCC processing which processes all messages from the MCC, SND. to FSCH processing which processes all messages sent to MS on the forward common signaling channel, SND. to FDCH processing which processes some messages sent to MS and CEC on forward dedicated signaling channel, SND. to MCC processing which processes all messages sent to the MCC, Layer 2 Processing which processes Layer 2 information, Hash Processing which performs the hash function to decide CDMA channel and Paging Channel number, Timer Processing which handles timer set, timer cancel, and timeout processing, and Utility which provides primitives and debugging commands.

Transmit and Receive Interface (TRX) 40

The TRX block 40 controls and diagnoses hardware devices in the BTS 14, and includes:

The PUC/PDC Block 42

The PUC/PDC 42 up-converts and down-converts between a baseband signal and an IF signal.

The Transceiver Control (XCVR) Block 44

The Transceiver Control Block (XCVR) 44 controls transceiver operations which carry IF signals to a carrier frequency band.

AMP Control Block

For high power amplification of the signal, the IP-BS provides the interface to the AMP. The AMP control block controls AMP operations such as ON/OFF.

Hardware Diagnostic Test Module

The diagnostic test module provides the functionalities for hardware characteristics test of pn3383 such as AWGN test, access probe test, etc. For example, the pn3383 test implements test environment conditions.

The power amplifier (PA) 66, via the RRCU 46, amplifies the output signal because the output of the XCVR 44 tends to be small. As such, a broader coverage area is possible.

Operation, Administration and Maintenance (OAM) Block 52

The OAM block 32 is associated with the following functionality: a Configuration Management (CM) block 34 that configures each block or module of the BTS 14 based on program load data (PLD) information (which includes parameters, such as a system ID, an IP address, etc., to configure the system) received from the BSM (or IP-BS) 99, a Status Management (SM) block 36 that obtains a status of the BTS 14 and reports the status to the BSM, and a Fault Management (FM) block 38 that checks and detects system faults or alarms and reports them to the BSM.

Figure 2:
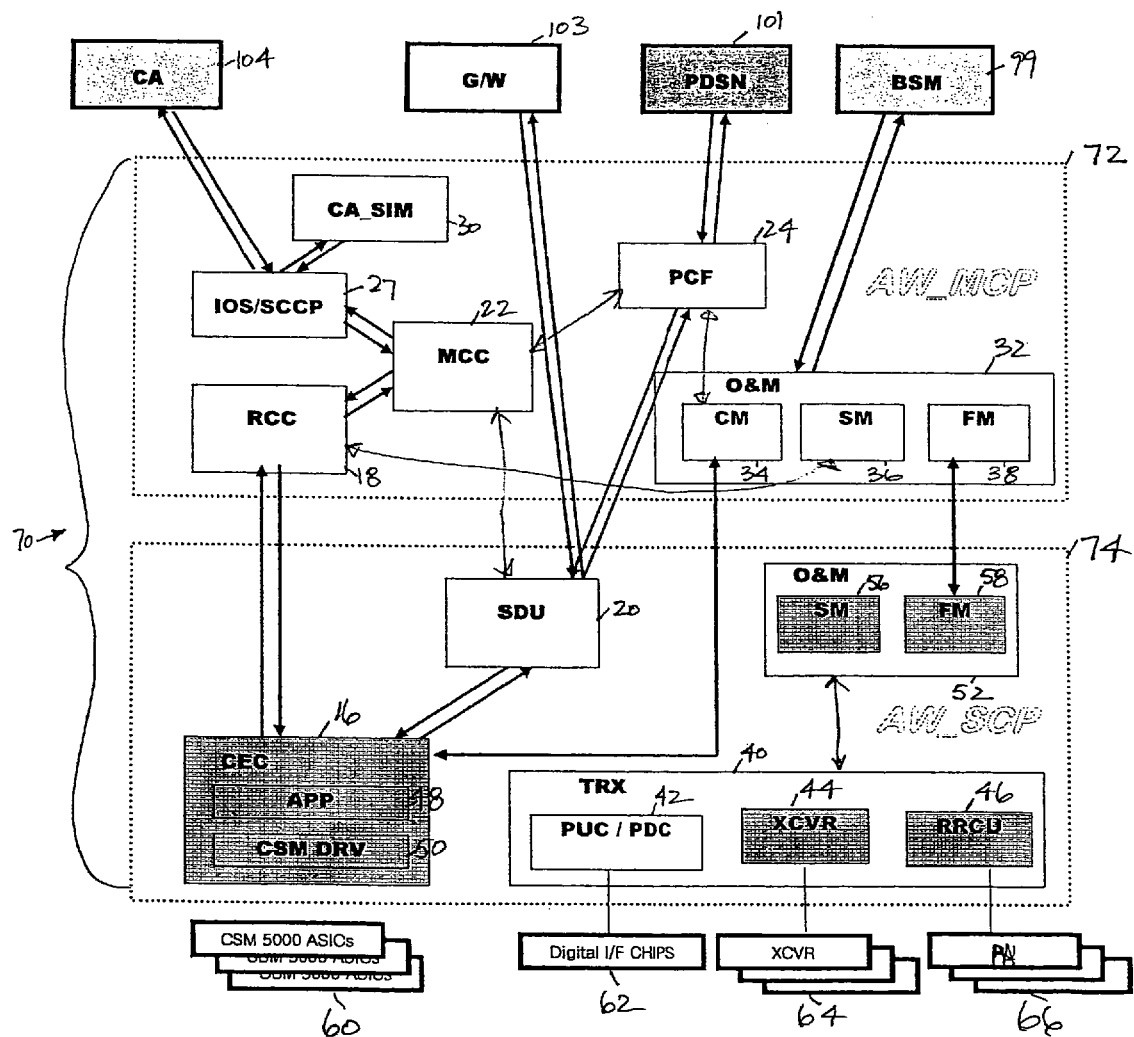
FIG. 2 depicts a stackable RAN in accordance with a preferred embodiment of the present invention.

Referring now to FIG. 2, the components of a stackable IP Radio Access Network (RAN) 70 are depicted. The blocks in the RAN 70 perform a similar functionality to their respective blocks in the RAN 10. Such a stackable RAN 70 provides increased bandwidth and redundancy without utilizing a card based expansion scheme as has been previously employed. Rather, the RAN 70 is modular and stackable (in a very small footprint) and includes a control portion (the Main Control Processor (MCP)) 72 and a device portion (the SDU/CEC Processor (SCP)) 74. With a centralized control portion 72, various device portions 74 can be utilized with a single control portion.

A difference between the RAN 70 and the RAN 10 is that the SDU 20 is now co-located with the CEC 16, and the RCC 18 is co-located with the MCC 22. As such, messaging between these co-located blocks is decreased providing an increase in system performance.

Figure 3:
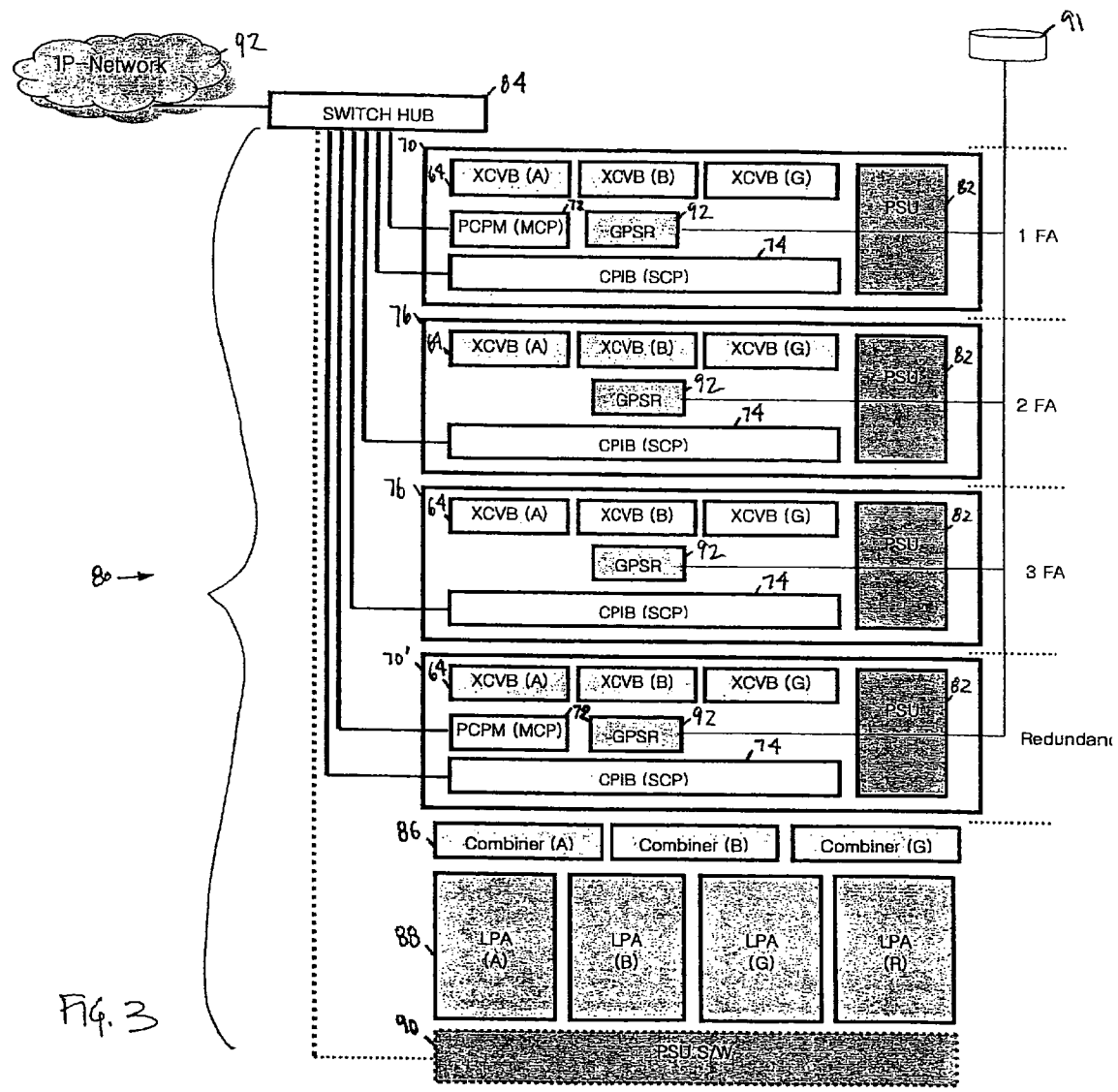
FIG. 3 depicts a further stackable RAN in accordance with a preferred embodiment of the present invention.

Referring now to FIG. 3, a stackable configuration 80 of the RAN of the present invention is depicted. The configuration 80 includes a RAN 70 that includes a master MCP 72 and a RAN 70' that includes a slave MCP 72. The master and slave MCPs preferably have the same IP address for redundancy. If the master MCP fails, a seamless transition to the slave MCP occurs. Backhaul timing is a limited issue because information is transferred between a BTS and a BSC in one "box" and not across a longer distance as with a typical network. The configuration 80 further includes RANs 76 which do not contain an MCP but rather, are controlled by the master MCP 72 in RAN 70. Each of the RANs depicted 70, 70', and 76 include at least one transceiver 64, power supply 82, and GPS receiver 92 that synchronizes the timing between the BSC 12 and the BTS 14 and between the MCP 72 and the SCP 74 per information received from a database 91 and/or GPS related satellites.

The configuration 80 may also include a combiner 86 that may combine a plurality of frequency segments to a common transmission line or antenna, a power amplifier 88 (which is similar to power amplifier 66), and a power supply 90 that could be used to re-set or re-start the RANs 70, 70', and 76. A switch hub 84 may be included to provide a single access (via, for example, an IP address), between the configuration 80 and the IP network 92.

Figure 4:
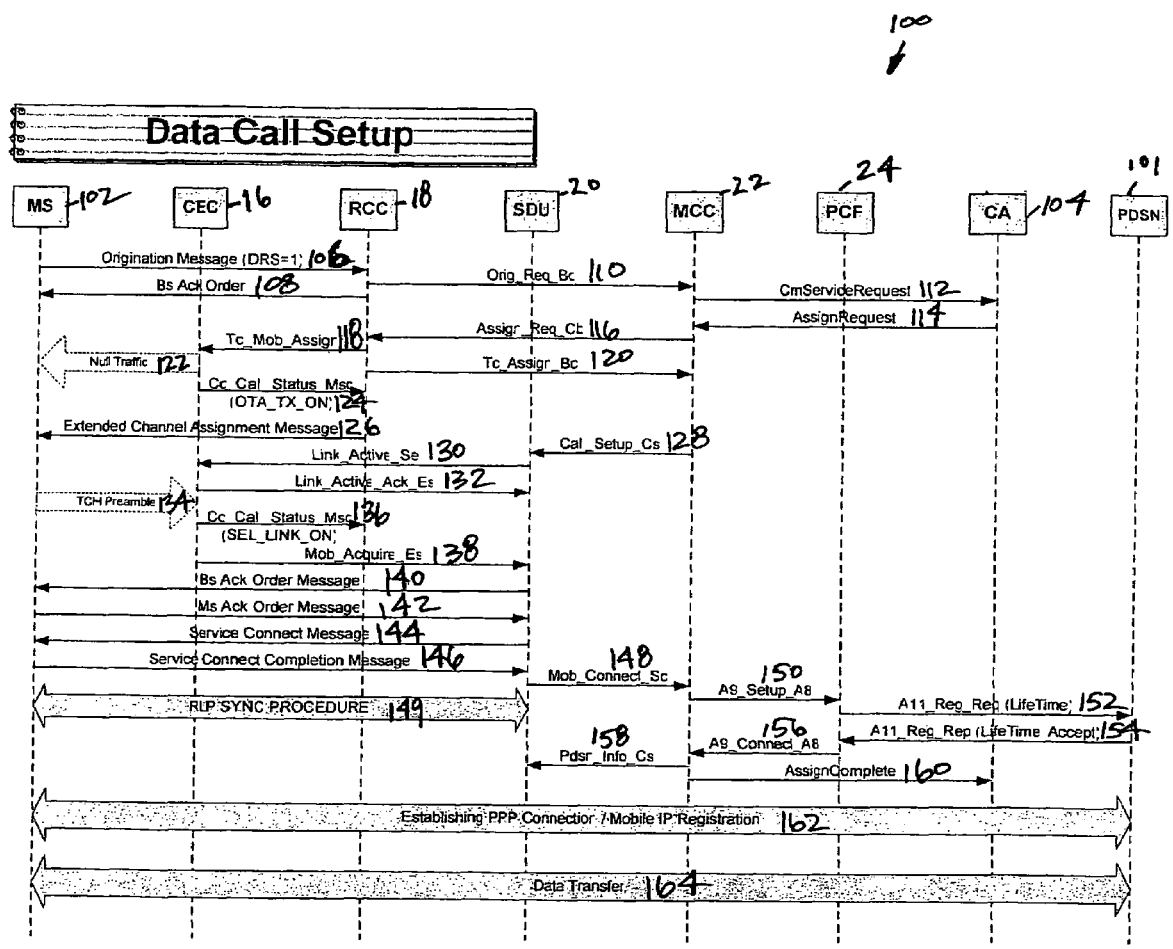
FIG. 4 depicts a message flow of a data call setup in accordance with a preferred embodiment of the present invention.

Referring now to FIG. 4, a message flow of a data call setup 100 is depicted. The RCC 18 receives an Origination message 106 from the MS 102 through the CEC 16 (with access information, the MS identification, service option, DSR (=1) and other call related information), unpacks the message, stores significant call related information for furthermore processing, and sends a Base Station Acknowledgement message 108 to the MS 102 and an origination message 110 to the MCC 22 with the MS identification information. The MCC 22 constructs a CM Service Request 112 message (based on, for example, the IS-2001-B specification), places it in the Complete Layer 3 Information message, and sends the message to the CA 104. When an Assignment Request message 114 is received from the CA 104, the MCC 22 allocates an SDU ID, and sends an Assignment Request message 116 to the RCC 18 to request an assignment of radio resources. This message includes information on the SDU resource information for the $A_{bis}$ interface, Service Option, MS identification, etc.

Upon receiving the Assign Request message 116 from the MCC 22, the RCC 18 allocates radio resources and then sends a Traffic Channel Assign message 118 with assign type (=NEW) to the CEC 16 in order to assign Forward and Reverse Traffic Channel Elements. The RCC 18 sends a TC assign message 120 with traffic channel allocation information to the MCC 22. When the CEC 16 receives the Tc_Mobile_Assign message 118 from the RCC 18, it sets the CSM driver with the parameters in the message to activate the CSM ASICs 60 to prepare call setup. The CEC 16 sends a null traffic frame 122 to the MS 102 and an OTA_TX_ON message 124 (indicating the CEC 16 is sending a null frame to MS) to the RCC. The RCC 18 makes and sends an Extended Channel Assignment message 126 to the MS 102 through the CEC 16.

After receiving the TC Assign message 120 from the RCC 18 with the result of ASSIN_OK or ASSIGN_ALTERNATIVE, the MCC 22 sends a Call_Setup_Cs message 128 with the information on the MS as well as the BTS resource to the SDU 20 for initialization. The SDU 20 receives the Call_Setup_Cs message 128 that is sent from the MCC 22 to request selector initialization. The SDU 20 sends a Link_Active_Se message 130 with the SDU 20 resource information to the CEC 16 which assumes that the link between the CEC and the SDU 20 has been established, and sends a Link_Act_Ack_Es message 132 to the SDU 20 to acknowledge the receipt of the Link_Active_Se message.

Upon acquiring the signal 134 of the MS 102, the CEC 16 sends a SEL_LINK_ON message 136 indicating that call setup is complete to the RCC which updates the call state with Active (BUSY). When the CEC 16 acquires the signal of the MS 102, it sends a Mob_Acquire_Es message 138 to the SDU 20, indicating the reverse traffic channel has been established. Once the SDU 20 acquires the reverse traffic channel, it sends a Forward Traffic message 140 including a Base Station Acknowledgement Order with layer 2 acknowledgement required, to the MS 102 over the forward traffic channel. Upon receiving the MS Ack Order message 142 from the MS 102, the SDU 20 sends a Service Connect message 144 with layer 2 acknowledgement required to the MS 102 over the forward traffic channel. The SDU 20 receives a Service Connect Completion message 146 that is sent from the MS 102, and then sends a Mobile Connect message 148 to the MCC 22 to indicate the MS 102 connection.

The SDU 20 starts RLP processing 149 with the MS 102. Upon receiving the Mobile Connect message 148 from the SDU 20, the MCC 22 transmits an A9-Setup-A8 message 150 to the PCF 24 with a Data Ready Indicator set to 1 to establish an A8 connection. The PCF 24 receives the A9-Setup-A8 message 150 with the Data Ready Indicator set to 1 from the MCC 22 in order to establish an A8 connection, and stores call related information for further processing. The PCF 24 selects a PDSN 101 to establish the A10 connection for the new service instance, and sends an A11-Registration Request message 152 with non-zero Lifetime value to the selected PDSN with accounting data. The PCF 24 unpacks an A11-Registration Reply message 154 and verifies a reply result with code value. If the code value is valid, the PCF establishes the A10 connection. The PCF 24 establishes the A8 connection and sends an A9-Connect-A8 message 156 with a value set to successful operation.

Upon receiving the A9-Connect-A8 message 156 from the PCF 24, the MCC 22 transmits a Pdsn_Info_Cs message 158 with the PCF 24 reference ID to the SDU 20 and an Assignment Complete message 160 to the CA 104. The SDU 20 receives the Pdsn_Info_Cs message 158 from the MCC 22 to indicate the PDSN 101 is connected and relays data packet using the PDSN 101 information. A PPP connection 162 with MIP Registration is established between the MS 102 and the PDSN 101 through the BS. A Data Transfer 164 occurs between the MS 102 and the PDSN 101 through the BS.

Figure 5:
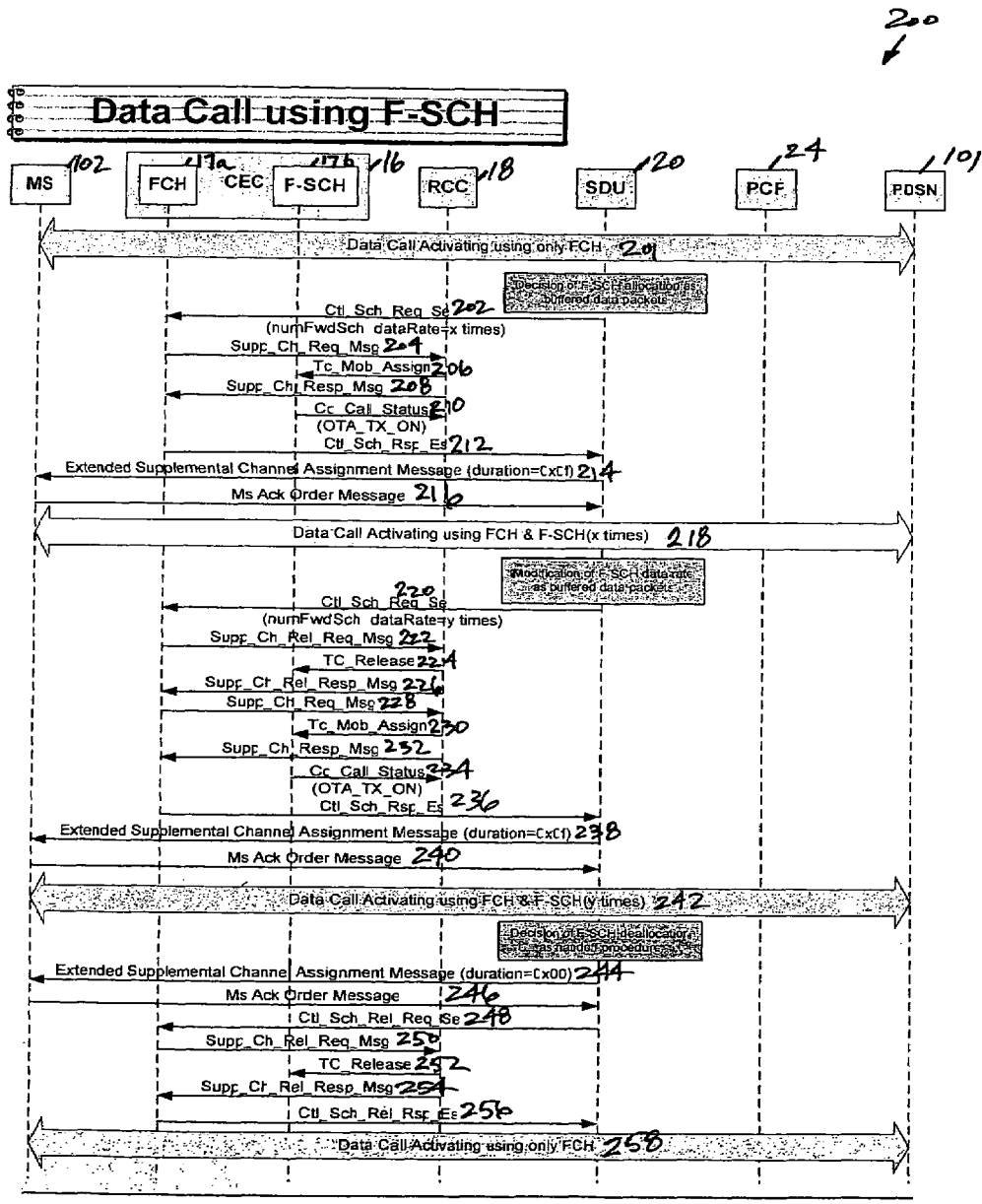
FIG. 5 depicts a message flow of a data call using a forward supplemental channel in accordance with a preferred embodiment of the present invention.

Referring now to FIG. 5, a message flow of a data call using a forward supplemental channel 200 is depicted. The SDU 20 determines a forward supplemental channel (SCH) should be needed for an increased forward data rate (=X times) and sends a Supplemental Channel Request Control message 202 to the CEC 16 to request a resource allocation related to the Supplemental Channel (requested parameter: forward SCH data rate, Walsh code for forward SCH, number of forward SCH, frame duration for forward SCH).

When the CEC 16 receives the forward SCH setup request with required number of F_SCH and its data rate from the SDU 20, it sends a Supp_Ch_Req_Msg 204 (channel type=F_SCH) with the number of F_SCH required, data rate and radio configuration to the RCC 18 to request a traffic channel resource assignment for the F_SCH.

Upon receiving the Supplemental Channel Request message (with channel type=F_SCH), a number of channels needed, a data rate (=x times), and RC information from the CEC 16, the RCC 18 checks if forward traffic channels are available. If available, the RCC 18 allocates forward supplemental channels and a Walsh code channel. Otherwise, the RCC 18 attempts to decrease the data rate and allocates as much as it can. The updates add resource allocation information into this call related resource buffer.

The RCC 18 sends a Traffic Channel Assign message 206 with channel type and assign type to the CEC 16 based on the allocated forward supplemental channels. The RCC 18 sends a Supplemental Channel Response message 208 with assigned channel type (=F_SCH), number of channels, and a data rate to the CEC 16. The CEC 16 sets a CSM driver with the parameters in the message to activate the CSM ASICs 60 and starts the service of the F_SCH which sends an OTA_TX_ON 210 message to notify the RCC 18 that the F_SCH sends forward packets. When the CEC (FCH task) receives the Supp_Ch_Resp_Msg (channel type=F_SCH), it responds to the SDU 20 that the F_SCH call setup for the forward data service SDU request has been completed.

The CEC 16 sends a Supplemental Channel Response Control message 212 to the SDU 20 to acknowledge the forward SCH assignment with allocated information. The SDU 20 sends an Extended Supplemental Channel Assignment message 214 with forward SCH data rate, Walsh code for the forward SCH, a number of forward SCH, and a frame duration for the forward SCH to allow the MS 102 use utilize them for higher data processing. The MS 102 then sends an acknowledgement message 216 to the SDU 20.

During processing X times data rate 218, the SDU 20 may decide to change a data rate to Y times. In such a scenario, the SDU sends a Supplemental Channel Request Control message 220 to the CEC 16 to request a resource allocation related to the Supplemental Channel (requested parameter: forward SCH data rate, Walsh code for forward SCH, number of forward SCH, and frame duration for forward SCH). When the CEC receives a Ctl_Sch_Req_Se message from the SDU 20 for changing the data rate of the current F_SCH, it sends a Supp_Ch_Rel_Req_Msg 222 to the RCC 18 to make the RCC release the current F_SCH for the data rate change.

The RCC 18 releases the forward supplemental channels (as much as were requested) and sends a Release message 224 to each F_SCH 17b. The RCC also transmits a Supplemental Channel Release Response message 226 with a number of channels and channel identifications released in order to notify it to the F_FCH. The CEC 16 stops the F_SCH service and removes the resource occupied for the F_SCH, and sends a Supp_Ch_Req_Msg 228 with new data rate the SDU 20 requested to the RCC 18 in order to request a new F_SCH data call setup.

Upon receiving Supplemental Channel Request message 228 with channel type (=F_SCH), number of channels needed, data rate (=y times), and RC information from the CEC 16, the RCC 18 checks if forward traffic channels are available (as much as are required). If available, the RCC 18 allocates forward supplemental channels and Walsh code channel. Otherwise, the RCC 18 tries to decrease the data rate and allocates as much as it can. The updates add resource allocation information into this call related resource buffer.

The RCC 18 sends a Traffic Channel Assign message 230 with channel type and assign type to the CEC 16 (as much as is allocated) and forward supplemental channels. The RCC 18 sends a Supplemental Channel Response message 232 with assigned channel type (=F_SCH), number of channels, and data rate to the CEC 16. When the CEC 16 receives a TC Assign message 230 from the RCC 18, it sets a CSM driver with the parameters (radio configuration, data rate, forward power control parameter, SDU IP address, etc.) in the message to activate the CSM ASICs 60, and starts the service of F_SCH. After the F_SCH sends a forward packet over the air, the CEC 16 sends an OTA_TX_ON message 234 to the RCC 18 to notify it. Upon receiving the Supp_Ch_Resp_Msg 232 from the RCC 18, the CEC 16 responds 236 to the SDU 20 that the F_SCH has been changed and served with the data rate the SDU 20 requested.

The SDU 20 updates and changes the forward data rate (Y times) per the response in the Ctl_Sch_Rsp_Es message and sends an Extended Supplemental Channel Assignment message 238 with forward SCH data rate, Walsh code for forward SCH, number of forward SCH, and a frame duration for forward SCH to allow the MS 102 to use them for the changed data processing rate. The MS 102 sends an acknowledgement message 240 to the SDU 20. During processing of the Y times data rate 242, the SDU 20 may determine that it does not need the F_SCH any more for forward data service because the data rate has been decreased. In such a scenario, the SDU sends an Extended Supplemental Channel Assignment message 244 with ZERO duration to inform the MS 102 to not use the assigned F_SCH.

After receiving the Ms Ack Order Message 246 from the MS 102, the SDU 20 sends a Ctl_Sch_Rel_Req_Se message 248 with a number of F_SCH to be released to request a F_SCH release to the CEC 16. When the CEC 16 receives the Ctl_Sch_Rel_Re_Se message 248 from the SDU 20 to stop forward packet transmission with current F_SCH, it sends a Supp_Ch_Rel_Req_Msg 250 (channel type=F_SCH) with a number of F_SCH and an identification to the RCC 18 to release the current F_SCH. Upon receiving the Supplemental Channel Release Request message, the RCC 18 releases the forward supplemental channels (as much as requested) and sends a Release message 252 to each F_SCH 17b. The RCC 18 transmits a Supplemental Channel Release Response message 254 with a number of channels and channel identifications released to the F_FCH 17a. The CEC 16 stops the F_SCH service and removes the resource occupied for F_SCH.

The CEC 16 sends a Ctl_Sch_Rel_Rsp_Es message to the SDU 20 to notify the SDU that the CEC 16 released the F_SCH. The SDU 20 sets the number of F_SCH used to ZERO and does not use the F_SCH for forward data processing 258.

Figure 6:
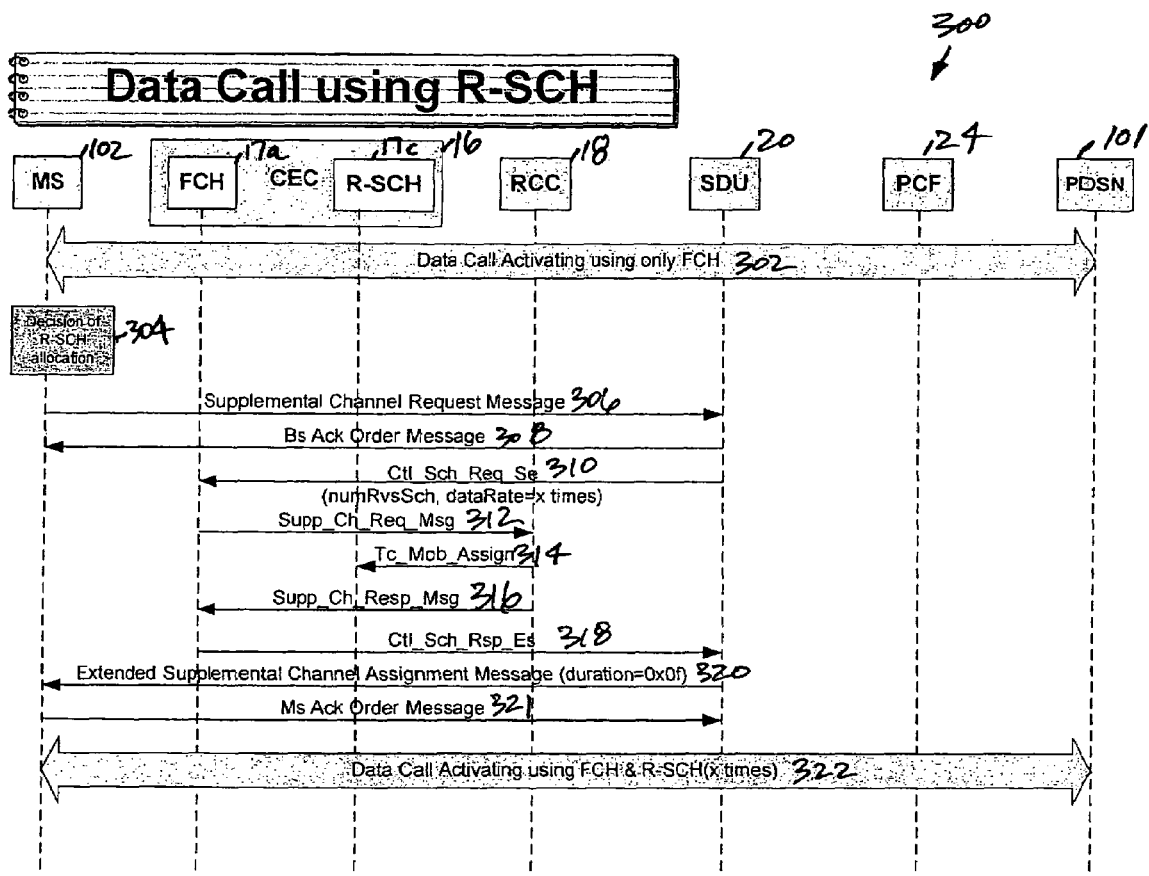
FIG. 6 depicts a message flow of a data call using a reverse supplemental channel in accordance with a preferred embodiment of the present invention.

Referring now to FIG. 6, a message flow of a data call using a reverse supplemental channel 300 is depicted. While the data call is engaged with the FCH 302, the MS 102 may determine it needs the R_SCH for higher reverse data processing 304 and thus sends a Supplemental Channel Request message 306 to the BS. The SDU 20 receives and sends an Acknowledge Order message 308 to the MS 102. The SDU 20 sends a Supplemental Channel Request Control message 310 to the CEC 16 to request a resource allocation related to Supplemental Channel (requested parameter: reverse SCH data rate, Walsh cover ID for reverse SCH, number of reverse SCH, and a frame duration for reverse SCH) to get the R_SCH as much of the data rate requested by the MS 102.

When the CEC receives the Ctl_Sch_Res_Se message with number of reverse SCH and the data rate from the SDU 20, it sends a Supp_Ch_Req_Msg 312 (channel type=R_SCH) to the RCC 18 to setup a reverse data service with R_SCH. Upon receiving a Supplemental Channel Request message (with channel type=R_SCH, number of channels needed, data rate (=x times), and RC information from the CEC), the RCC 18 checks if the reverse traffic channels are available (as much as required). If available, the RCC 18 allocates reverse supplemental channels. Otherwise, the RCC 18 attempts to decrease the data rate and allocate as much as it can. The updates add resource allocation information into this call related to a reverse resource buffer.

The RCC 18 sends a Traffic Channel Assign message 314 with channel type and assign type to the CEC 16 (as much as allocated reverse supplemental channels). The RCC 18 sends a Supplemental Channel Response message 316 with an assigned channel type (=R_SCH), a number of channels, and data rate to the CEC 16. The CEC 16 sets a CSM driver with the parameters (such as radio configuration, data rate, long code mask, reverse power control parameter, Walsh cover, search window length, SDU IP address, etc.) in the message to activate the CSM ASICs 60, and starts the R_SCH service.

Upon receiving the Supp_Ch_Resp_Msg 316 with the assign result and information from the RCC 18, the CEC 16 sends a Ctl_Sch_Rsp_Es message 318 to the SDU 20 to respond that the R_SCH call setup for reverse data service is complete. The SDU 20 sends an Extended Supplemental Channel Assignment message 320 with a reverse SCH data rate, Walsh cover ID for reverse SCH, number of reverse SCH, and frame duration for reverse SCH to let the MS 102 utilize them for higher data processing 322. An acknowledgement message 321 is sent from the MS 102 to the SDU 20 in response to the message 320.

Figure 7:
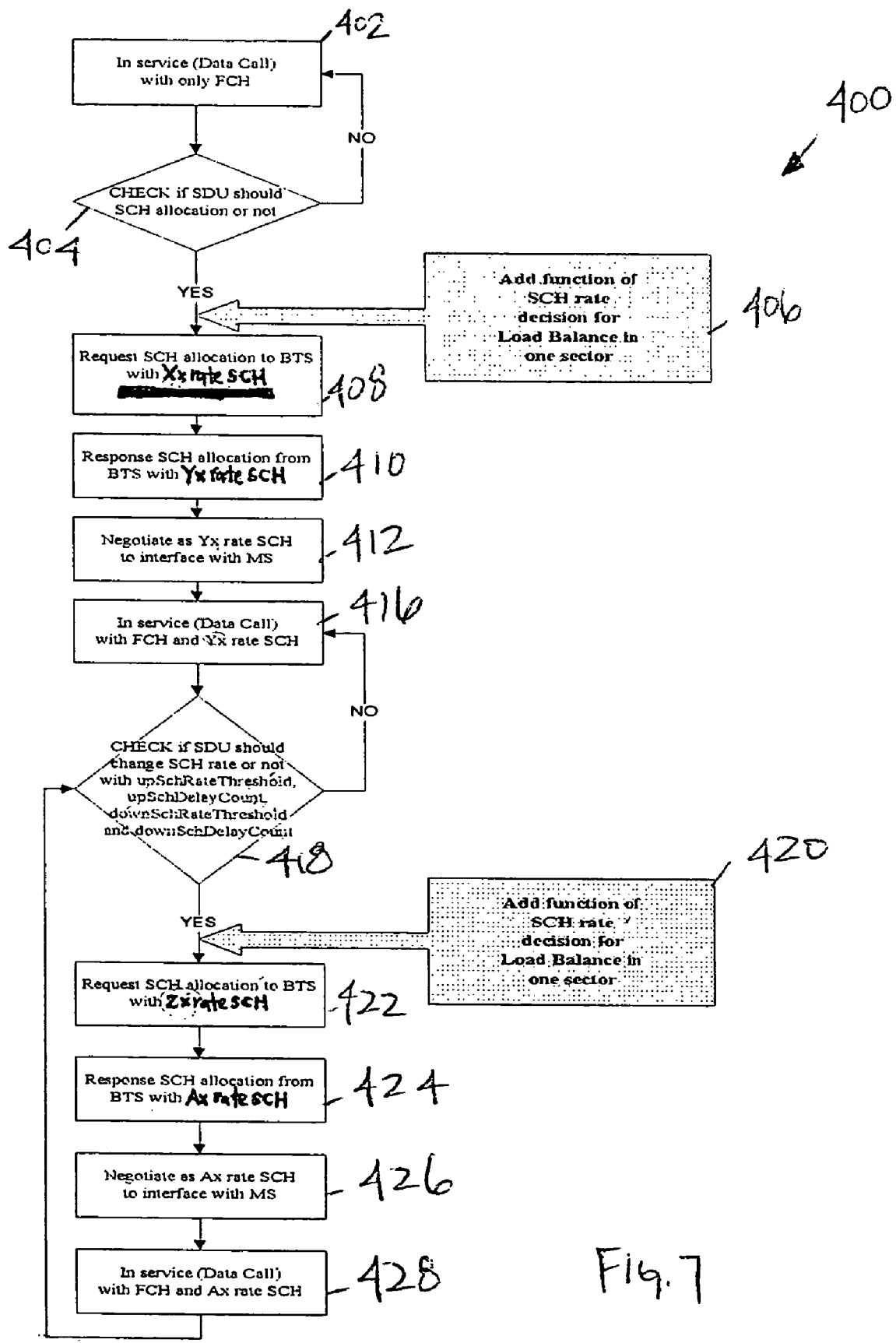
FIG. 7 depicts a Quality of Service flow chart for a data call in accordance with a preferred embodiment of the present invention.

Referring now to FIG. 7, a Quality of Service (QoS) flow chart for a data call 400 is depicted. The data call is, for example, a 1xRTT data call. The QoS functionality permits users (mobile stations) to use similar data speed for various data services in limited radio resource circumstances. The maximum throughput is about 140 Kbps in, for example, a 1xRTT data call. However, it is not possible to support over 3 users at the 140 Kbps rate within a single sector due to the Walsh code structure. Further, within a sector, the maximum serviceable sector throughput is about 500 Kbps. As such, there is a need to reallocate radio resources to all users according to the number of calls attempted.

The flow begins at step 402 when a data call is in service utilizing only a fundamental channel (FCH). A check 404 is performed to determine if the SDU 20 should allocate a supplemental channel (SCH) to provide a proper throughput of the data. This determination is based on an amount of buffering data from the PDSN 101. If a SCH is not needed, the flow resumes at step 402. However, if it is determined that the SDU should allocate a SCH, a function 406 of a SCH rate decision for load balancing in a sector is added. This function takes into account the available radio resource and thus may alter the data rate assumed by the SDU. For example, the SDU may believe that a 16× data rate is warranted, but based on the radio resource condition, an 8× data rate may be utilized as shown in step 408. As such, the load is balanced for each sector.

More specifically, at step 408, an SCH allocation to a BTS 14 is requested by the SDU 20 with an X× rate (which, as the example above stated, is 8×). This request is preferably for a service option of 33, which, for a 1xRTT data call provides for a max data rate of 16×. The BTS 14 responds to the request with a Y× rate SCH at step 410. Although the SDU 20 has made the decision that the X× data rate is appropriate, the CEC 16 and the RCC 18 (in the BTS 14) may determine that it is not appropriate due to additional bandwidth requirements. In such a scenario, the data rate can change and if it did, the SDU 20 would also utilize that changed data rate. In various instances, however, the X× data rate will be equal to the Y× data rate. At step 412, a negotiation of the Y× rate SCH to interface with a mobile station occurs. At this point 416, the data call with the FCH and the Y× rate SCH is in service.

A check 418 is performed to determine if the SDU 20 should change the SCH rate. This check is performed because radio resources may be impacted if additional users are utilizing SCHs. During such a scenario, the data rate may again have to be adjusted to accommodate the increased bandwidth requirements. Various parameters are used to determine if the SCH rate should change including an upSchRateThreshold and upSchDelayCount (which are used if the data rate is to be increased) and downSchRateThreshold and downSchDelayCount (which are used if the data rate is to be decreased). As such, the SDU could determine the SCH data rate should be changed or could determine the Y× data rate is appropriate. If the Y× rate is appropriate, the flow reverts back to step 416. If, however, it is determined that the Y× data rate for the SCH should change, a function 420 of a SCH rate decision for load balancing in a sector is added. This function takes into account the available radio resource and thus may alter the data rate assumed by the SDU 20. For example, the SDU 20 may believe that an 8× data rate is warranted, but based on the radio resource condition, a 4× data rate may be utilized as shown in step 422. As such, the load is balanced for each sector. It is important to note that the SDU 20 regularly performs a data rate traffic check between the PDSN 101 and the mobile station and the data rate can be increased and/or decreased.

More specifically, at step 422, an SCH allocation to the BTS 14 is requested by the SDU 20 with a Z× rate (which, as the example above stated, is 4×). The BTS 14 responds to the request with an A× rate (which may be, for example, 2×) SCH at step 424. Although the SDU 20 made the decision that the Z× data rate is appropriate, the CEC 16 and the RCC 18 (in the BTS 14) may determine that it is not appropriate due to additional bandwidth requirements. In such a scenario, the data rate can change and if it did, the SDU 20 would also utilize that changed data rate. In various instances, however, the Z× data rate will be equal to the A× data rate. At step 426, a negotiation of the A× rate SCH to interface with the mobile station occurs. At this point 428, the data call with the FCH and the A× rate SCH is in service. The flow continues to check 418.

Referring now to FIG. 8, a table 500 indicating a supplemental channel (SCH) rate for a data call is depicted. The table 500 provides a view of using Walsh codes based on a number of FCHs utilized 510 in a 16× data rate 502, an 8× data rate 504, a 4× data rate 506, and a 2× data rate 508. A Walsh code is one of 64 chip patterns which are 64 chips long. CDMA channels are differentiated by which Walsh code they use. These 64 codes are also known as Walsh sequences. Since every signal is spread over a particular channel (such as a 1.25 MHz channel) and transmitted over the entire bandwidth at once, up to 64 mobile stations could use the channel at once. In practice, however, the number depends on the data throughput.

Figure 9:
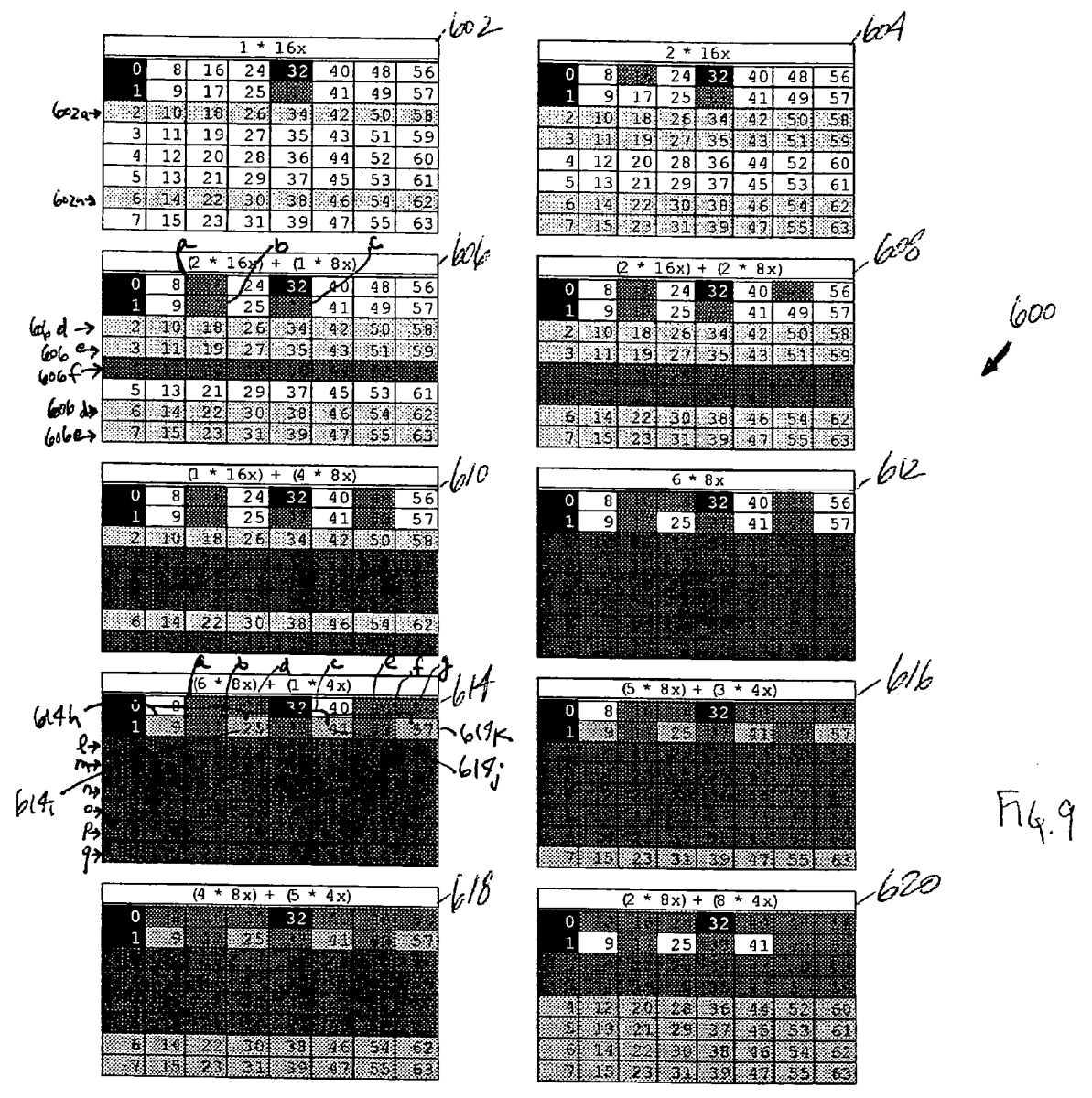
Figure 9:
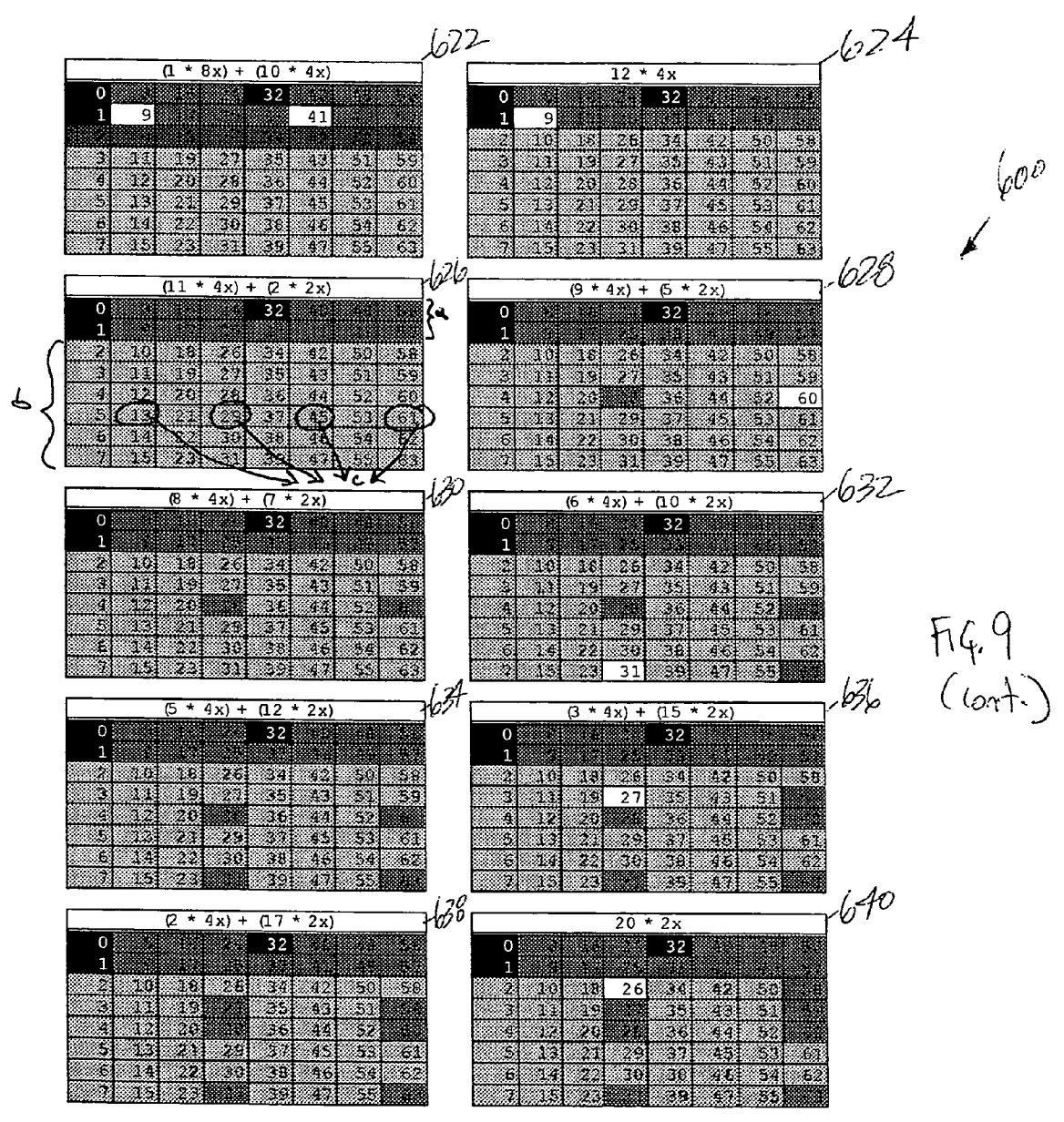

Referring now to FIG. 9, a plurality of tables 600 (and specifically tables 602-640) more fully describe each of the utilized FCHs 510. The tables 600, which coincide with the table 500, describes the use of 1 to 20 FCHs in relation to a number of data rates including 16×, 8×, 4×, and 2×. In each instance, the 0, 1, and 32 code are used for overhead channels (such as pilot channels and synch channels) and the 33 code is used for a FCH. In the table 602, a single FCH and a single 16 rate SCH 602a are depicted. In the table 606, three FCHs (606a, 606b, and 606c), two 16 rate SCHs (606d and 606e), as well one 8 rate SCH (606f) are depicted. In the table 614, seven FCHs (614 a-g), one 4 rate SCH (614h-k), and six 8 rate SCHs (614l-q) are depicted. In the table 626, thirteen FCHs (626a, less the fixed channels), eleven 4 rate SCHs (626b, less the 2 rate channels), and two 2 rate channels (626c).

Referring now to FIG. 10, a table 700 indicating a maximum SCH rate according to a number of data call attempts 702 is depicted. For example, if twelve data calls were attempted in one sector, the maximum SCH rate could be supported by twelve 4 rate channels, while if thirteen data calls were attempted in one sector, the maximum SCH rate could be supported by eleven 4 rate channels and two 2 rate channels.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the modules RANs 70, 70', and 76, and/or by one or more of the blocks 16-58. Also, these capabilities may be performed in the current manner or in a distributed manner and on, or via, any device able to transfer information between the RANs, the blocks, and/or other components. Further, although depicted in a particular manner, various blocks may be repositioned without departing from the scope of the current invention. For example, the RCC 18 may be positioned in the BSC 12, while the SDU 20 may be positioned in the BTS 14. Still further, although depicted in a particular manner, a greater or lesser number of RANs and/or blocks may be utilized without departing from the scope of the current invention. For example, additional RANs 76 may be utilized in the configuration 80 of the present invention.

What is claimed is:

1. A method for determining a data call rate, comprising:
   determining if a supplemental channel (SCH) should be allocated;
   if the SCH should be allocated, potentially altering the data rate;
   requesting by a modular and stackable Internet Protocol (IP) Radio Access Network (RAN), comprising a centralized Master Main Control Processor (MMCP)), wherein the MMCP further includes a Slave Master Control Processor (SMPC), wherein the MMCP and the SMCP both have a same Internet Protocol address, the MMCP coupled to a plurality of selector distribution unit (SDU) channel element control (CEC) Processors (SCPs) an SCH allocation at a current data rate or the altered data rate; and
   receiving a response to the request with the current data rate, the altered data rate, or a further altered data rate.

2. The method of claim 1 comprising negotiating one of the data rates and placing a data call in service using the negotiated data rate.

3. The method of claim 2 comprising determining if the negotiated data rate should be altered.

4. The method of claim 3 comprising, if the negotiated data rate should be altered, potentially altering the data rate.

5. The method of claim 4 comprising requesting an SCH allocation at the negotiated data rate or at a different data rate.

6. The method of claim 5 comprising receiving a response to the request with the negotiated data rate, the different data rate, or a further different data rate.

7. The method of claim 6 comprising negotiating one of the negotiated data rate, the different data rate, or the further different data rate, and placing a data call in service using one of the negotiated data rate, the different data rate, or the further different data rate.

8. The method of claim 1, wherein the data call is initially in service utilizing a fundamental channel (FCH).

9. The method of claim 1, wherein the determining if the SCH should be allocated is performed by a selector distribution unit (SDU).

10. The method of claim 9, wherein the determining if the SCH should be allocated is based on an amount of buffering data from a packet data serving node (PDSN) which is coupled to the SDU.

11. The method of claim 1, wherein potentially altering the data rate is determined by an available radio resource, and wherein the data rate is altered for load balancing purposes.

12. The method of claim 11, wherein the load is balanced for each sector.

13. The method of claim 9, wherein the requesting of the SCH allocation at the current or altered data rate is performed by the SDU to a base transceiver station (BTS).

14. The method of claim 13, wherein the response to the request with the current data rate, the altered data rate, or a further altered data rate is received by the SDU form the BTS which may determine that the further altered data rate is needed due to bandwidth requirements.

15. The method of claim 14, wherein the current data rate, the altered data rate, and/or the further altered data rate are at least one of:
   a different data rate; and
   a same data rate.

16. The method of claim 2, wherein the negotiating of the data rate is performed with a mobile station.

17. The method of claim 3, wherein if the negotiated data rate should be altered is determined by a selector distribution unit (SDU) based on bandwidth requirements.

18. A system for determining a data call rate, comprising:
   a centralized Master Main Control Processor (MMCP), wherein the MMCP further includes a Slave Master Control Processor (SMPC), wherein the MMCP and the SMCP both have a same Internet Protocol address, the MMCP coupled to a plurality of selector distribution unit (SDU) channel element control (CEC) Processors (SCPs);
   each of the plurality of SCPs comprising an SDU coupled to a CEC;
   wherein the determines if a supplemental channel (SCH) should be allocated;
   wherein at least one of the SCPs receives an SCH allocation at a current data rate or an altered data rate from the BSC; and
   wherein the MCP receives the current data rate, the altered data rate, or a further altered data rate from the at least one SCP.

19. The system of claim 18, wherein the MCP and the at least one SCP comprise a modular and stackable Internet Protocol (IP) Radio Access Network (RAN).

20. A computer readable medium encoded with instructions for:
   determining if a supplemental channel (SCH) should be allocated;

requesting by a modular and stackable Internet Protocol (IP) Radio Access Network (RAN), comprising a centralized Master Main Control Processor (MMCP), wherein the MMCP further includes a Slave Master Control Processor (SMPC), wherein the MMCP and the SMCP both have a same Internet Protocol address, the MMCP coupled to a plurality of selector distribution unit (SDU) channel element control (CEC) Processors (SCPs) an SCH allocation at a current data rate or the altered data rate; and receiving a response to the request with the current data rate, the altered data rate, or a further altered data rate.

* * * * *